April 18, 1939.  F. BISZANTZ  2,155,253
TIRE AND TOOL CARRYING COMPARTMENT IN TRUCKS
Filed March 31, 1938  3 Sheets-Sheet 1
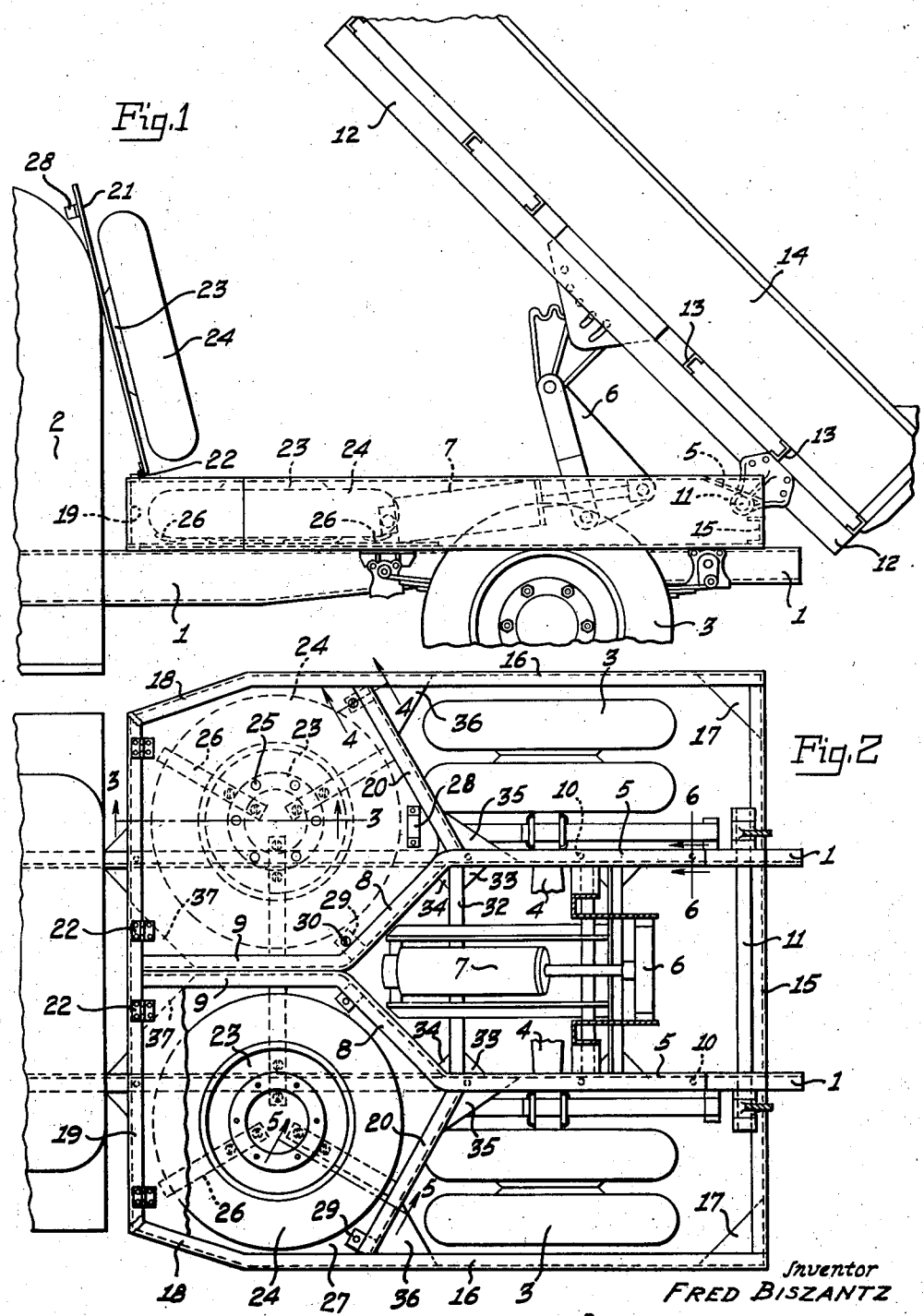
Inventor
FRED BISZANTZ April 18, 1939.  F. BISZANTZ  2,155,253
TIRE AND TOOL CARRYING COMPARTMENT IN TRUCKS
Filed March 31, 1938   3 Sheets-Sheet 2
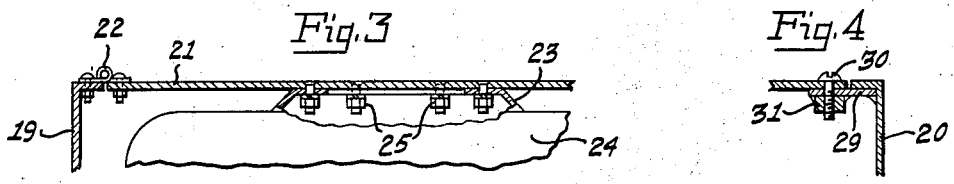
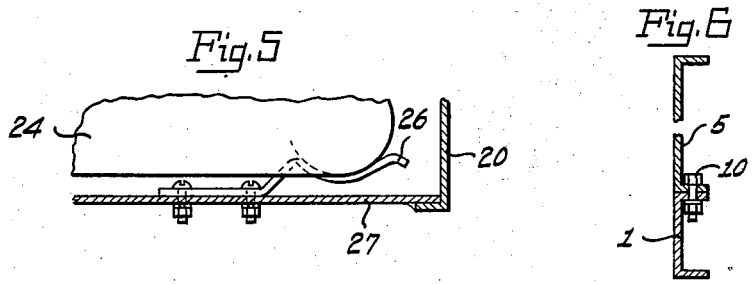
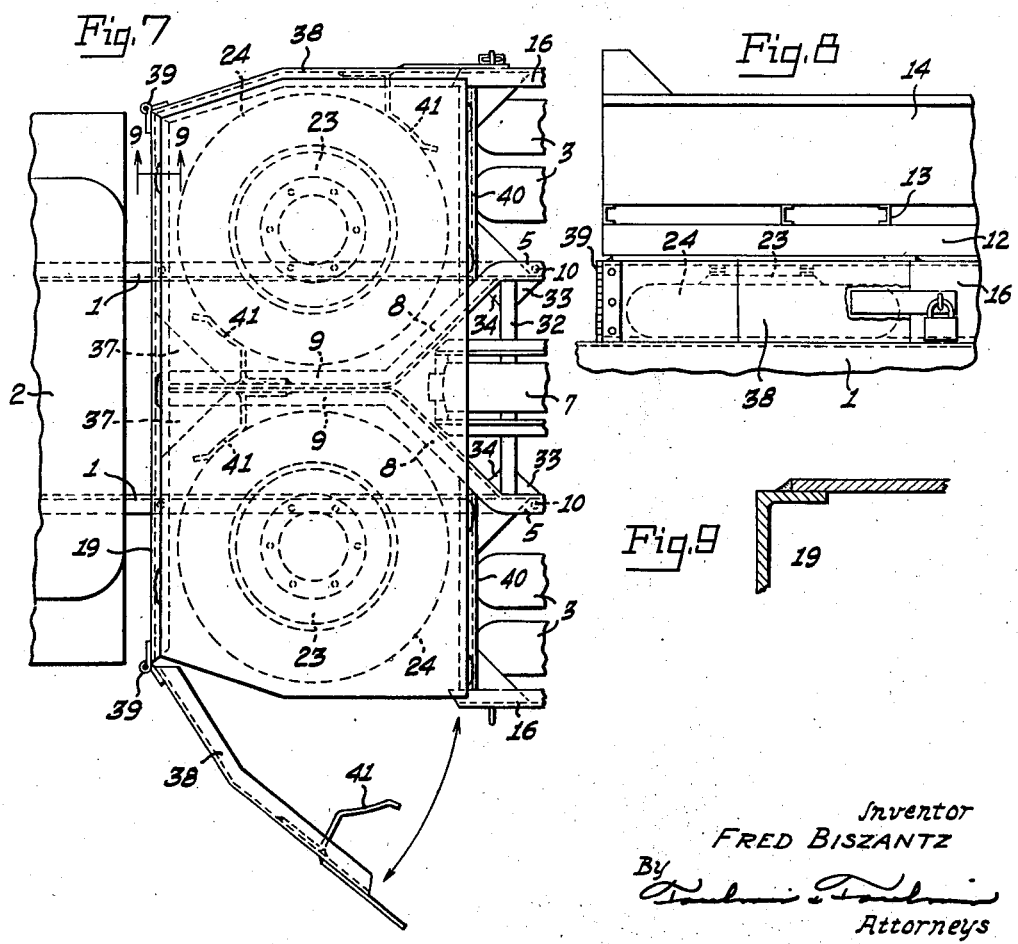
Inventor
FRED BISZANTZ
By
Attorneys April 18, 1939.   F. BISZANTZ   2,155,253
TIRE AND TOOL CARRYING COMPARTMENT IN TRUCKS
Filed March 31, 1938   3 Sheets-Sheet 3
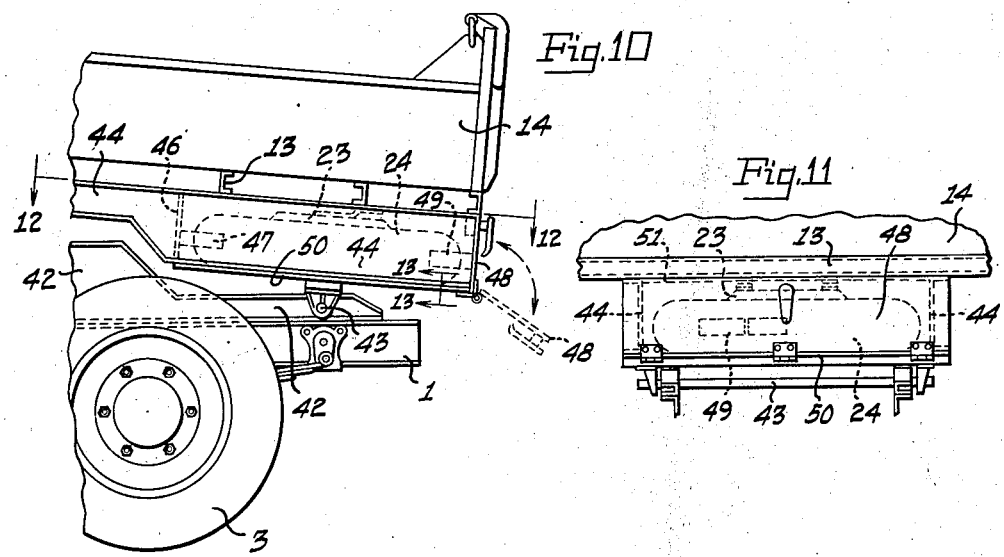
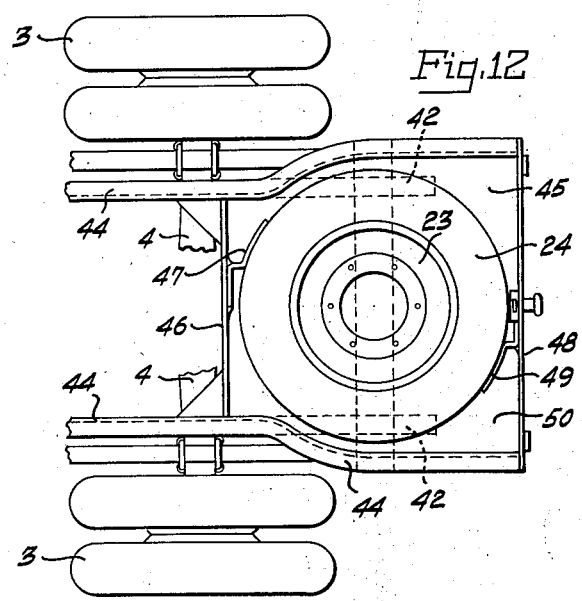
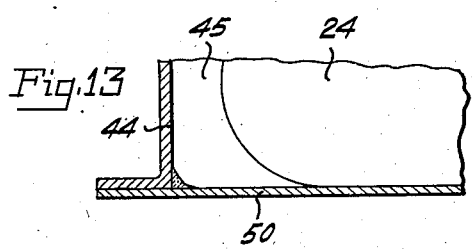
Inventor
FRED BISZANTZ
Attorneys Patented Apr. 18, 1939

2,155,253

UNITED STATES PATENT OFFICE 2,155,253

TIRE AND TOOL CARRYING COMPARTMENT IN TRUCKS

Fred Biszantz, Galion, Ohio, assignor to The Galion Metallic Vault Company, Galion, Ohio, a corporation of Ohio Application March 31, 1938, Serial No. 199,213

REISSUED

10 Claims. (Cl. 298—1)

My invention relates to cargo-carrying trucks and, in particular, to means and methods of carrying tires and other equipment.

Heretofore, it has been a problem in the art to store tires in cargo-carrying trucks without interfering with the operation of the stationary or dump bodies, without shortening such bodies, or without interfering with the access to the engine or the cab. It has been a further problem because tires carried in exposed locations suffered rapid deterioration from light, heat, and other elements incident to the use of a truck.

It is the object of this invention to provide means for storing a tire so that when the dump body is in its lowered position, it will prevent any access to the tire.

It is a further object to provide means for so supporting the tire that, when the dump body is lifted, this means will lift the tire into a ready position for its removal.

It is an additional object to use such means as a cover for the compartment, in which the tire is located.

It is a further object of this invention to provide means for a dual storage of tires so that access may be had to the respective tires from either side of the vehicle.

It is an object of this invention to provide means for holding the tires in position so that they will not move during transit, thereby injuring and chafing the tire and causing unnecessary noises of the tire and the wheel upon which it is mounted.

It is an additional object of this invention to provide means of optional character for access to the tire from the sides of the vehicle so that after the body is tilted, the tire can be detached and moved outwardly from the side of the vehicle.

It is a further object of this invention to provide means in connection with the sub-frames of the vehicle to so mount the tire that it can still be supported within a tilting body, can be removed from the end of the vehicle and will not interfere with the tilting operation of the body.

Referring to the drawings:

Figure 1 is a side elevation of a truck having a tilted dump body elevated and with the tire compartment cover raised with the tire attached to it;

Figure 2 is a top plan view of the sub-frame showing the arrangement of the sub-frame members, the tire compartments and the relationship of the several parts to the truck and truck frame and elevating mechanism. One of the covers of one of the tire compartments has been partly broken away, and a portion of the body elevating mechanism and pivotal supports is shown in section;

Figure 3 is a section on the line 3—3 of Figure 2, looking in the direction of the arrows;

Figure 4 is a section on the line 4—4 of Figure 2, looking in the direction of the arrows;

Figure 5 is a section on the line 5—5 of Figure 2, looking in the direction of the arrows;

Figure 6 is a section on the line 6—6 of Figure 2, looking in the direction of the arrows;

Figure 7 is a view similar to Figure 2, showing a modification in which there is a continuous cover over both tire compartments, that is optionally removable or hinged. The ends of the compartments are open and are adapted to be closed by swinging doors with means for positioning the tire to hold it in position;

Figure 8 is a side elevation of Figure 7;

Figure 9 is a section on the line 9—9 of Figure 7, looking in the direction of the arrows;

Figure 10 shows the rear end of a truck and tilting body with a tire carrier in the rear end with means for removing the tire from the rear of the vehicle;

Figure 11 is a rear elevation of Figure 10;

Figure 12 is a top plan view, taken on the line 12—12 of Figure 10, looking in the direction of the arrows, of a sub-frame at its rear end and the rear end of a truck, showing a tire support between said sub-frame and a tire compartment illustrating, in detail, the arrangement of such parts as are shown in elevation in Figures 10 and 11; and Figure 13 is a section on the line 13—13, looking in the direction of the arrows, of Figure 10.

Referring to the drawings in detail, I designates the longitudinal frame members of a truck having a cab 2 and wheels 3 mounted upon the axle 4. These main frame members I of the truck are used to support the longitudinal intermediate inboard frame members 5 which form a support for, and a part of, the tilting body assembly.

These members, as shown in Figure 2, are arranged in parallel at the rear half of the body in order to form a space between them for the elevating mechanism consisting of the mechanical linkage 6 and the hydraulic lifting cylinder 7. They converge at 8 until they meet at 9, so that the members are in parallel where the sections 9 engage one another. The rear halves of these intermediate inboard frame members 5 are bolted by the bolts 10 or by any other attaching means to the truck frame members 1.

These intermediate, inboard frame members also carry pivotally, as by the axle 11, the body frame members 12 upon which are mounted the cross frame members 13 which, in turn, support the body 14. A transverse cross frame member 15 joins the ends of the longitudinal members 5 and extends beyond them to support the rear ends of the outboard longitudinal intermediate frame members 16, to which they are bolted or welded and connected by gusset plates 17. These outboard frame members 16 are deeper than the rear end member 15. They extend forwardly and then inwardly, as at 18, where they are attached to the forward cross frame member 19 which also abuts the ends of the intermediate inboard longitudinal frame members 9.

These intermediate inboard longitudinal frame members, at 5, are connected by diagonal brace members 20 with the outboard intermediate frame members 16. Thus, the frame members 8, 9, 19, 18, 16 and 20 form tire compartments, the top of which is closed by the cover 21, hinged at 22 on the forward cross member 19. This cover 21 carries the wheel 23, on which is mounted the tire 24. The wheel is attached by the usual bolts 25 to this cover 21. Thus, the intermediate frame members form oppositely disposed compartments for the storage of tires or other materials such as tools.

The tires are mounted and positioned, when the cover 21 is lowered, in spring fingers 26 which serve to support and cushion them in a manner to prevent rattling and chafing. The compartments are provided with bottoms such as the plates 27.

The lids 21 have hand holes 28 so that the tire and lid can be lifted. The support for these lids at their rear end consists of the bracket plates 29 welded to the diagonal members 8 and 20 and shown in detail, in section, in Figure 4. The plates 29 have the lids 21 bolted to them or otherwise attached, as may be desired. The screw bolt 30 is the attaching means and is threaded through the plate 29 and the nut 31 welded to the plate 29. Thus the body can tilt without interfering with the tires. When the body is down, no access can be secured to the tire compartments. When the tire compartments are opened by lifting the lid 21, the tire is exposed and can be readily attached or detached.

The intermediate inboard frame members are connected together by a centrally disposed cross frame member 32 and by gusset plates 33 and 34. Gusset plates 35 connect the members 5 and the members 20. Plates 36 connect the members 20 and 16. Plates 37 connect the members 9 and 19.

It will be observed that this intermediate frame member serves the multiple function of supporting, pivotally, the dump body 14 at the proper height, acts as a support for the elevating mechanism and an enclosure for it, acts as an outboard support beyond the wheels 3 within which the wheels 3 turn as between the members 5 and 16; also acts as a framework for the tire carrying compartments.

There is further versatility in Figures 7, 8 and 9, where the side frame members 16 terminate adjacent the rear ends of the tire compartments. The forward ends of these frame members 16 are formed into doors 38 hinged at 39 on the forward cross frame member 19. These doors give access to the tire carrying compartments so that the compartments may be reached either through the sides of the vehicle and its intermediate frame or from the top thereof by lifting the cover 21. In this modification, cross frame members 40 join the diagonal frame members 8 and side frame members 16. Within the tire compartments are spring fingers 41 which serve to position and cushion the tires.

In Figures 10 to 13, there is shown a modification of this general construction in that the tire compartment is formed in the intermediate frame supporting the truck body and travels with it when it is tilted.

In this form, the truck frame 1 has mounted thereon the intermediate frame members 42, to which is pivoted at 43 by connection to the body frame members 44, the body 14 which is mounted by its cross frame members 13 upon the frame members 44. The rear ends of these members 44 are spread apart, as seen in Figure 12, to form room for receiving a tire 24 in the compartment 45. The rear of this compartment is formed by a wall 46 having a positioning spring finger 47, while the front of the compartment is closed by the rear door 48 having a positioning spring finger 49. The bottom is formed by the plate 50 and the top by a cover plate 51. It is, therefore, possible, with this construction, to have access to the tire through the rear compartment which tilts with the body.

It will be understood that I desire to comprehend within my invention such modifications as come within the scope of the claims and the invention.

The words "frame members" in the claims are intended to include either the longitudinal frame members, or the sub-frame or intermediate frame members 16.

Having thus fully described my invention, what I claim as new and desire to secure by Letters Patent is:

1. In combination, a truck frame, an intermediate frame, a body mounted on said intermediate frame, means formed by the intermediate frame to constitute a tire-carrying compartment accessible from the top of said intermediate frame when said body is moved therefrom, a cover for said compartment adapted to support a tire thereon and in said compartment, and means for pivoting said cover on top of said intermediate frame.

2. In combination, a truck frame, an intermediate frame having a tire-carrying compartment therein accessible from the top thereof, a pivoted cover on said frame adapted to close said compartment, and a dump body pivotally mounted on said intermediate frame adapted in its horizontal position to rest upon said cover.

3. In combination, a truck frame, an intermediate frame having a tire-carrying compartment therein accessible from the top thereof, a pivoted cover on said frame adapted to close said compartment, a dump body pivotally mounted on said intermediate frame adapted in its horizontal position to rest upon said cover, and means for supporting said tire on the under side of said cover.

4. In combination, a truck frame, an intermediate frame having a tire-carrying compartment therein accessible from the top thereof, a pivoted cover on said frame adapted to close said compartment, a dump body pivotally mounted on said intermediate frame adapted in its horizontal position to rest upon said cover, means for supporting said tire on the under side of said cover, and means for yieldingly supporting said tire when within said compartment.

5. In combination, a truck frame, an intermediate frame comprising inboard longitudinal frame members spaced at the rear of the frame and engaging one another at the front of the frame, means for pivotally supporting a truck body on said intermediate frame, means supporting elevating mechanism between said truck body and said intermediate frame, a transverse rear frame member and a transverse front frame member connected to said longitudinal frame members, outboard frame members connected to the transverse frame members, and transverse means connecting said outboard and inboard frame members, whereby compartments are formed within said frame members and means within said compartments for supporting a tire therein.

6. In combination, a truck frame, an intermediate frame comprising inboard longitudinal frame members spaced at the rear of the frame and engaging one another at the front of the frame, means for pivotally supporting a truck body on said intermediate frame, means supporting elevating mechanism between said truck body and said intermediate frame, a transverse rear frame member and a transverse front frame member connected to said longitudinal frame members, outboard frame members connected to the transverse frame members, and transverse means connecting said outboard and inboard frame members, whereby compartments are formed within said frame members and means within said compartments for supporting a tire therein, said means comprising covers for said compartments and means for attaching tires to said covers.

7. In combination, a main frame, an intermediate frame having tire compartments, doors for said compartments, a body adapted to be mounted on top of said compartments, and means associated with said compartments and said doors for holding and positioning the contents thereof with respect thereto.

8. In combination, longitudinal truck frame members, a box mounted between said truck frame members and constructed and arranged to receive a spare tire mounted therein, a cover for said box, a tilting body pivoted on said frame members adapted to have its bottom when in horizontal position in juxtaposed relationship to the cover of said box when closed to prevent said box cover from opening when the body is in lowered position.

9. In combination, a truck having longitudinal frame members, inclosure means disposed between the frame members constructed and arranged to receive a spare tire, means for retaining the tire in the inclosure means, a tilting body pivoted on said frame members adapted to have its bottom when in horizontal position in juxtaposed relationship to the top of said inclosure means to prevent access to the top of said inclosure means, and when in tilted position to provide access to the inclosure means.

10. In an automobile truck, the combination of a chassis frame, a tiltable load-carrying body, means for supporting said body above and in spaced relationship with the chassis frame to form a spare tire receiving compartment beneath the body accessible from the top when the body is tilted and also from the side of the truck, and supporting frame members for said body terminating at one side thereof adjacent said compartment so as not to interfere with the lateral movement of the tire in and out of the space between the bottom of the body and the chassis frame.

FRED BISZANTZ.